United States Patent
Wang et al.

(10) Patent No.: US 8,429,480 B2
(45) Date of Patent: Apr. 23, 2013

(54) USER SPECIFIC LOAD BALANCING

(75) Inventors: Hai Ming Wang, Beijing (CN); Da Jie Jiang, Beijing (CN); Yuan Zhu, Beijing (CN); Xiang Guang Che, Beijing (CN); Chun Yan Gao, Beijing (CN); Esa Juhani Tuomaala, Espoo (FI)

(73) Assignee: Nokia Corporation, Espoo (FI)

( * ) Notice: Subject to any disclaimer, the term of this patent is extended or adjusted under 35 U.S.C. 154(b) by 419 days.

(21) Appl. No.: 12/681,687

(22) PCT Filed: Sep. 30, 2008

(86) PCT No.: PCT/IB2008/053983
§ 371 (c)(1),
(2), (4) Date: Jun. 24, 2010

(87) PCT Pub. No.: WO2009/044344
PCT Pub. Date: Apr. 9, 2009

(65) Prior Publication Data
US 2011/0010598 A1    Jan. 13, 2011

Related U.S. Application Data

(60) Provisional application No. 60/997,765, filed on Oct. 5, 2007.

(51) Int. Cl.
*H04L 1/16*    (2006.01)
(52) U.S. Cl.
USPC .......................................................... 714/751
(58) Field of Classification Search .................... 714/751
See application file for complete search history.

(56) References Cited

U.S. PATENT DOCUMENTS

| | | | |
|---|---|---|---|
| 5,870,385 A * | 2/1999 | Ahmadi et al. | 370/252 |
| 6,301,286 B1 * | 10/2001 | Kanterakis et al. | 375/130 |
| 6,356,759 B1 * | 3/2002 | Mustajarvi | 455/450 |

OTHER PUBLICATIONS

Office Action received from European Patent Application No. 08835383.4, dated Jan. 19, 2011, 5 pages.
Office Action received from European Patent Application No. 08835383.4, dated May 27, 2011, 6 pages.

(Continued)

*Primary Examiner* — Stephen M Baker
(74) *Attorney, Agent, or Firm* — Nokia Corporation (57) ABSTRACT

In accordance with exemplary embodiments of the invention there is a method and apparatus to detect with a hybrid automatic repeat request function a collision between an uplink packet re-transmission and a new uplink packet transmission within a hybrid automatic repeat request process, and in response, to dynamically allocating resources for transmitting the new uplink packet transmission in a different hybrid automatic repeat request process that does not collide with the uplink packet re-transmission. In accordance with other exemplary embodiments of the invention, there is a method and apparatus to transmit a packet re-transmission in a hybrid automatic repeat request process using a semi-persistently scheduled uplink resource, and responsive to receiving a dynamic allocation of a different hybrid automatic repeat request process, to transmit a new packet using the dynamically allocated different hybrid automatic repeat request process.

20 Claims, 5 Drawing Sheets

OTHER PUBLICATIONS

Ericsson, "Semi-Persistent Scheduling" 3GPP Draft, R1-062863, RAN WG2, Oct. 4, 2006.
LG Electronics, "Considerations on UL HARQ" 3GPP RAN WG2, R2-072741, Jun. 22, 2007.
International Search Report and Written Opinion of the International Searching Authority for PCT Application No. PCT/IB2008/053983, dated Jun. 3, 2009, 13 pages.
3GPP TSG-RAN WG2 Meeting #57 R2-070476, Feb. 12-16, 2007 St Louis, Missouri, USA, Source: Nokia, Title: Uplink Scheduling for VoIP.
Nokia et al., "Implicit ACK/NAK for LTE DL", 3GPP, RI-072996, Jun. 19, 2007.
Nokia, 3GPP TSG-RAN WG2 Meeting #57Bis R2-071460, Mar. 26-30, 2007, "Uplink Scheduling for VoIP".

* cited by examiner

TABLE 1: SYSTEM SIMULATION PARAMETERS

| PARAMETER | CONFIGURATION |
|---|---|
| LAYOUT | HEXAGONAL GRID, 7 CELL SITES, 3 SECTORS PER SITE |
| ANTENNA PATTERN | 70 DEG (−3 dB) WITH 20 dB FRONT-TO-BACK RATIO |
| TDD CONFIGURATION | DSUDD (3 DL TTI, 1 SPECIAL TTI AND 1 UL TTI IN 5ms) |
| STANDARD DEVIATION OF SLOW FADING | 8 dB |
| SHADOWING CORRELATION BETWEEN CELLS/SECTORS | 0.5/1.0 |
| eNODEB/UE ANTENNA GAIN | 14 dBi/0 dBi |
| eNODEB RECEIVER | 2 ANTENNAS WITH MRC |
| THERMAL NOISE DENSITY | −174 dBm/Hz |
| FREQUENCY RE-USE | 1 |
| CHANNEL MODEL | 6-RAY TYPICAL URBAN |
| TRAFFIC MODEL | AMR 12.2 Kbps(50%-ACTIVITY 2-STATE MARKOV MODEL WITH 2 SECOND AVERAGE TALK-SPURT DURATION) |
| MAX UE Tx POWER | 24 dBm |
| CHANNEL UPDATE | PER SUB-FRAME (0.5 ms) |
| TTI LENGTH | 1ms |
| CONTROL OVERHEAD PER TTI | 12 LONG BLOCKS PER TTI FOR DATA (NO SOUNDING SYMBOL) |
| HARQ | NUM OF HARQ PROCESSES=2; SYNCHRONOUS HARQ THE SAME MCS FOR RETRANSMISSIONS; CHASE COMBINING, ACK/NACK ERRORS=0% |
| POWER CONTROL | SNR-BASED PC |
| FREQUENCY BAND ALLOCATION AND MCS | 2RU ALLOCATION: QPSK 2/3 FOR 12.2Kbps, QPSK 1/4 FOR SID PACKET; |
| DATA ASSOCIATED UL CONTROL SIGNALLING | 5MHz: 4RUs FOR CONTROL SIGNALLING, THEN 21 RUs LEFT FOR DATA |
| L2S | AM ASSUMING PRACTICAL PDE RECEIVER AND REALISTIC CHANNEL ESTIMATION |
| EVALUATION METHOD | 5% OUTAGE BASED ON USERS HAVING<98% OF ITS SPEECH FRAMES DELIVERED SUCCESSFULLY WITHIN 50 ms (PER<2%) |

FIG.4

TABLE 2: HARQ DISTRIBUTION

| CORRECT AFTER FIRST TRANSMISSION | CORRECT AFTER 1ST RETRANSMISSION | OTHERS |
|---|---|---|
| 66.31% | 27.92% | 5.77% |

USER SPECIFIC LOAD BALANCING

RELATED APPLICATION

This application was originally filed as PCT Application No. PCT/IB2008/053983 on Sep. 30, 2008 and claims priority to U.S. Provisional Application No. 60/997,765 filed on Oct. 5, 2007, which is incorporated herein by reference in its entirety.

TECHNICAL FIELD

The exemplary and non-limiting embodiments of this invention relate generally to wireless communication systems, methods, devices and computer program products and, more specifically, relate to techniques for providing automatic repeat request functionality between a base station and a user equipment.

BACKGROUND

Various abbreviations that appear in the specification and/or in the drawing figures are expanded as follows:
3GPP third generation partnership project
ACK acknowledge
aGW access gateway
ARQ automatic repeat request
DL downlink
EUTRAN evolved UTRAN
eNB EUTRAN Node B (evolved Node B)
FDD frequency division duplex
FDS A frequency division multiple access
FS frame structure
HARQ hybrid automatic repeat request
HSPA high speed packet access
LTE long term evolution
MAC medium access control (layer 2, L2)
MCS modulation and coding scheme
NACK negative acknowledge
NDI new data indicator
Node B base station
OFDMA orthogonal frequency division multiple access
PDCCH physical downlink control channel
PDU protocol data unit
PHICH physical hybrid-ARQ indicator channel
RTT round trip time
RU resource unit
SAW stop and wait
SC-FDMA single carrier, frequency division multiple access
TDD time division duplex
TTI transmission time interval
UE user equipment
UL uplink
UTRAN universal terrestrial radio access network
VoIP voice over internet protocol A proposed communication system known as evolved UTRAN (E-UTRAN, also referred to as UTRAN-LTE or as E-UTRA) is currently under development within the 3GPP. The agreement at the time of this invention is that the DL access technique is OFDMA, and the UL access technique is SC-FDMA.

One specification of interest to these and other issues related to the invention is 3GPP TS 36.300, V8.1.0 (2007 June), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

There has been discussed several HARQ issues related to LTE.

For example, for LTE a hybrid ARQ (HARQ) protocol that is proposed for use is similar to that of HSPA, namely N parallel hybrid ARQ processes, each implementing a SAW protocol. Each hybrid ARQ process has a certain amount of soft buffer memory in order to implement soft combining.

Figure 1:
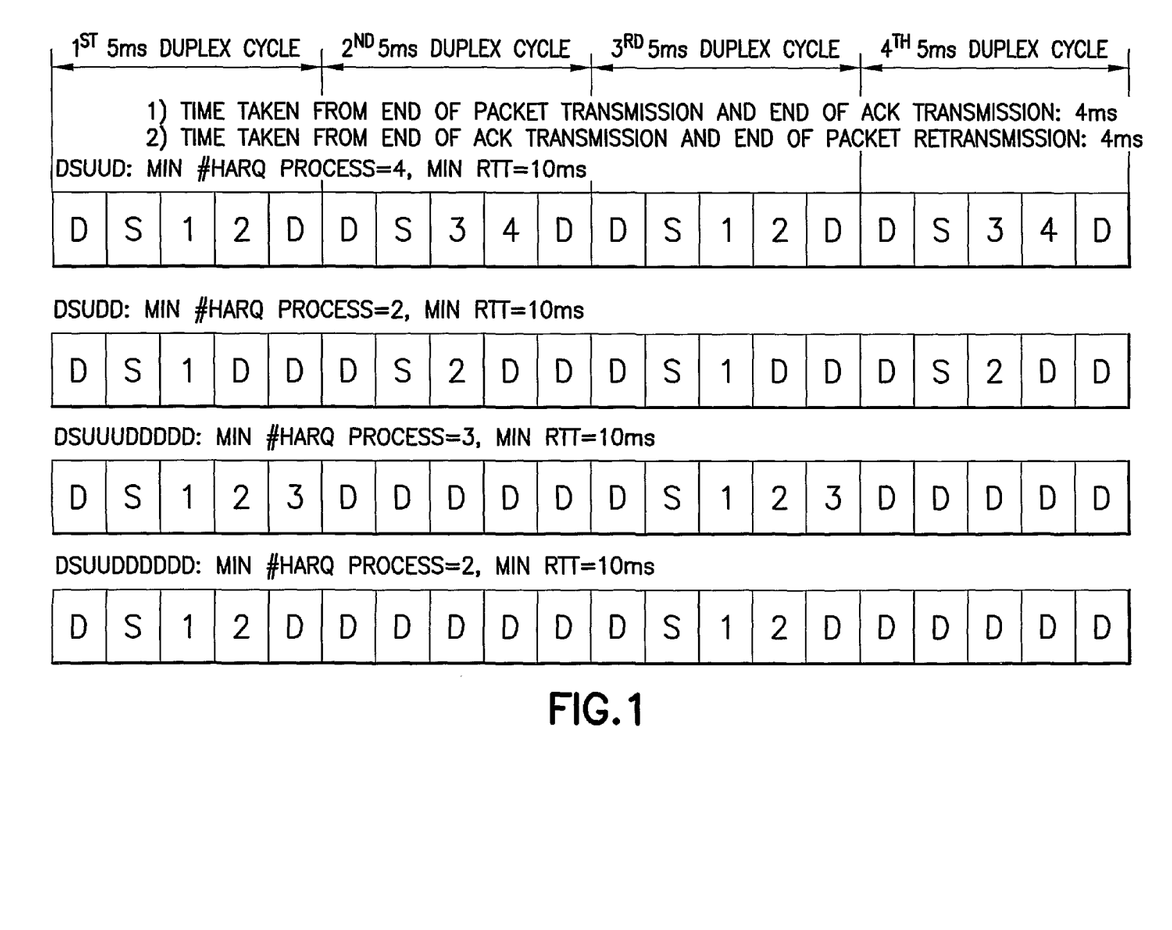
FIG. 1 depicts an example of TDD UL HARQ mapping.

Further, the number of hybrid ARQ processes should be selected to be as small as possible to minimize the delays associated with HARQ re-transmissions. For FDD the number of processes mainly depends on processing delays. However, for the case of TDD the number of processes required also depends on how sub-frames are allocated to the UL and DL. Considering the processing delays and DL/UL sub-frame configuration, one example of UL HARQ mapping in TDD is shown in FIG. 1. In this context "DSUUU" means 1 DL sub-frames, 1 special sub-frame and 3 UL frames in 5 ms, and the other cases are similar.

It can be further noted that synchronous HARQ has been selected for the LTE UL, so the HARQ process identifications (IDs) in the timeslots numbered as 1, 2, 3, or 4 are shown in darker greyin FIG. 1 are rigorously in order (sequential), and re-transmission must take place within the same HARQ process as its initial/new/first transmission.

Semi-persistent scheduling has also been agreed to for use in LTE, in particular for VoIP service, wherein initial/new transmissions of voice packets are persistently allocated (a set of resources in every 20 ms are predefined) and re-transmissions of packets are dynamically scheduled by Layer 1/Layer 2 signaling.

In semi-persistent scheduling, an initial transmission of voice packets is assumed to always have a higher priority than a re-transmission. Reference in this regard can be made to R2-070476, 3GPP TSG-RAN WG2 Meeting #57, 12-16 Feb. 2007, St. Louis, Miss., USA, "Uplink Scheduling for VoIP", Nokia.

In some cases of TDD (especially for the cases "DSUUD", "DSUDD", "DSUUUDDDDD" and DSUUDDDDD")), and due to the characteristic of HARQ process mapping, for one user the re-transmission of some packets can collide with initial transmissions of later packets, that is to say, the re-transmission of some packets and initial transmissions of other packets for one user are all located into the same HARQ process.

Figure 2:
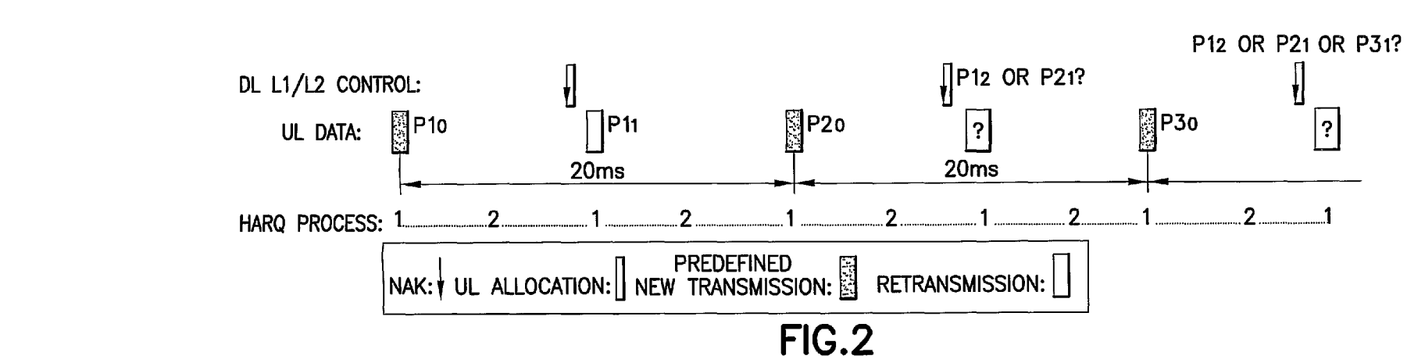
FIG. 2 illustrates a problem that can arise if all (re)transmissions take place in process #1.

For example, and considering the "DSUDD" case in FIG. 1 where there is only one UL sub-frame in the 5 ms interval, and there are a total of two HARQ processes, all of the (re)transmissions of one users' voice packets are in process #1 if the initial/new transmissions are allocated in process #1 (see FIG. 2 in this regard). In FIG. 2, $PX_Y$ implies the Yth retransmission of Packet X. Due to the number of (re)transmissions ongoing in process #1, in some timeslots it is difficult to determine which packet(new transmission or retransmission) is to be transmitted (indicated as '?' in FIG. 2). Further still, and even if process #2 of this user is empty and free, this user cannot transfer its high traffic load (some number of packets) to process #2 due to restrictions imposed by synchronous HARQ and semi-persistent scheduling. As a result the resource efficiency of this particular user is low. Furthermore, some packet delay is inevitable.

SUMMARY

In an exemplary aspect of the invention, there is a method comprising detecting with a hybrid automatic repeat request function a collision between an uplink packet re-transmission and a new uplink packet transmission within a hybrid automatic repeat request process, and in response, the hybrid automatic repeat request function dynamically allocating resources for transmitting the new uplink packet transmission in a different hybrid automatic repeat request process that does not collide with the uplink packet re-transmission.

In another exemplary aspect of the invention, there is a computer readable medium encoded with a computer program executable by a processor to perform actions comprising detecting with a hybrid automatic repeat request function a collision between an uplink packet re-transmission and a new uplink packet transmission within a hybrid automatic repeat request process, and in response, the hybrid automatic repeat request function dynamically allocating resources for transmitting the new uplink packet transmission in a different hybrid automatic repeat request process that does not collide with the uplink packet re-transmission.

In another exemplary aspect of the invention, there is an apparatus comprising a hybrid automatic repeat request functional unit configured to detect with a hybrid automatic repeat request function, a collision between an uplink packet re-transmission and a new uplink packet transmission within a hybrid automatic repeat request process, and in response, the hybrid automatic repeat request functional unit configured to dynamically allocate resources for transmitting the new uplink packet transmission in a different hybrid automatic repeat request process that does not collide with the uplink packet re-transmission.

In another exemplary aspect of the invention, there is an apparatus comprising means for detecting with a hybrid automatic repeat request function, a collision between an uplink packet re-transmission and a new uplink packet transmission with a hybrid automatic repeat request process, and in response, means for dynamically allocating resources for transmitting the new uplink packet transmission in a different hybrid automatic repeat request process that does not collide with the uplink packet re-transmission.

In still another exemplary aspect of the invention, there is a method comprising transmitting a packet re-transmission in a hybrid automatic repeat request process using a semi-persistently scheduled uplink resource, and responsive to receiving a dynamic allocation of a different hybrid automatic repeat request process, transmitting a new packet using the dynamically allocated different hybrid automatic repeat request process.

In another exemplary aspect of the invention, there is a computer readable medium encoded with a computer program executable by a processor to perform actions comprising transmitting a packet re-transmission in a hybrid automatic repeat request process using a semi-persistently scheduled uplink resource, and responsive to receiving a dynamic allocation of a different hybrid automatic repeat request process, transmitting a new packet using the dynamically allocated different hybrid automatic repeat request process.

In yet another exemplary aspect of the invention, there is an apparatus comprising a hybrid automatic repeat request functional unit configured to transmit a packet re-transmission in a hybrid automatic repeat request process using a semi-persistently scheduled uplink resource, and responsive to receiving a dynamic allocation of a different hybrid automatic repeat request process, the hybrid automatic repeat request functional unit configured to transmit a new packet using the dynamically allocated different hybrid automatic repeat request process.

In still another exemplary aspect of the invention, there is an apparatus comprising means for transmitting a packet re-transmission in a hybrid automatic repeat request process using a semi-persistently scheduled uplink resource, and responsive to receiving a dynamic allocation of a different hybrid automatic repeat request process, means for transmitting a new packet using the dynamically allocated different hybrid automatic repeat request process.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 6:
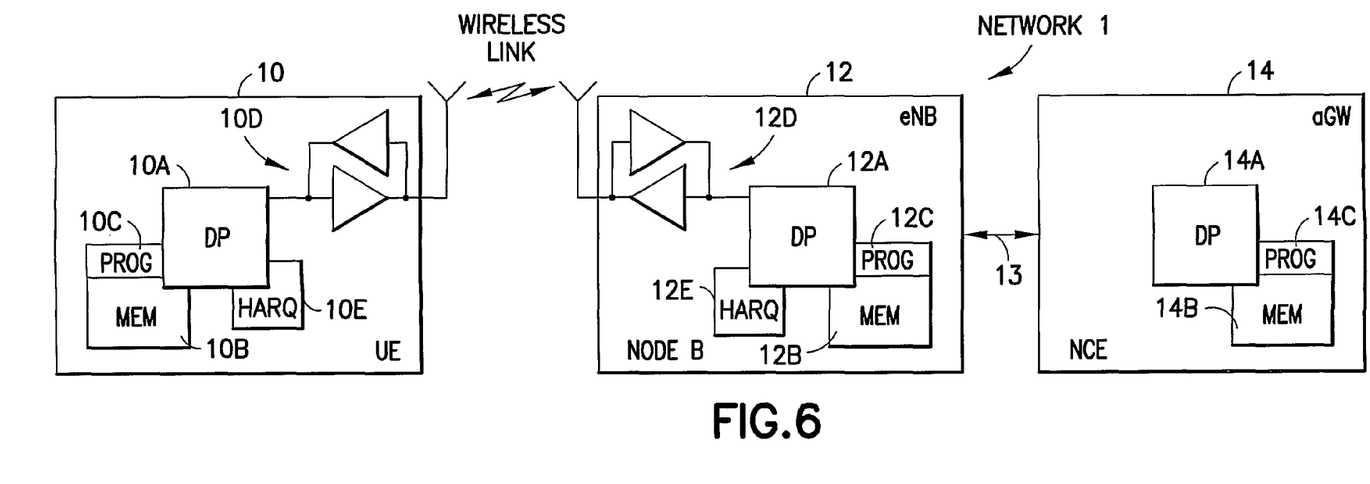
FIG. 6 shows a simplified block diagram of various electronic devices that are suitable for use in practicing the exemplary embodiments of this invention.

Reference is made first to FIG. 6 for illustrating a simplified block diagram of various electronic devices that are suitable for use in practicing the exemplary embodiments of this invention. In FIG. 6 a wireless network 1 is adapted for communication with a UE 10 via a Node B (base station) 12. The network 1 may include a network control element (NCE) 14, such as an aGW. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the NCE 14 that also includes a DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

Reference with regard to the teachings of this invention can be made to 3GPP TS 36.321 v8.2.0 (2008 May), 3rd Generation Partnership Project; Technical Specification Group Radio Access Network; Evolved Universal Terrestrial Radio Access (E-UTRA) and Evolved Universal Terrestrial Access Network (E-UTRAN); Medium Access Control (MAC) protocol specification (Release 8). In addition, reference can be made to 3GPP TS 36.213 v8.3.0 (2008 May), 3rd Generation Partnership Project; Technical Specification Group Radio Access Network; Evolved Universal Terrestrial Radio Access (E-UTRA) and Evolved Universal Terrestrial Access Network (E-UTRAN); Physical layer procedures (Release 8).

As supported in 3GPP TS 36.321 v8.2.0 (2008 May) there is one HARQ entity at the UE. A number of parallel HARQ processes are used in the UE to support the HARQ entity, allowing transmissions to take place continuously while waiting for the feedback on the successful or unsuccessful reception of previous transmissions. At a given TTI, if an uplink grant is indicated for the TTI, the HARQ entity identifies the HARQ process for which a transmission should take place. It also routes the receiver feedback (ACK/NACK information), MCS and resource, relayed by the physical layer, to the appropriate HARQ process.

At the given TTI, the HARQ entity shall:
if an uplink grant indicating that the NDI has been incremented compared to the value in the previous transmission of this HARQ process is indicated for this TTI or if this is the very first transmission for this HARQ process (i.e. a new transmission takes place for this HARQ process):
if there is an ongoing Random Access procedure and there is a MAC PDU in the [Message3] buffer:
obtain the MAC PDU to transmit from the [Message3] buffer.
else, if the "uplink prioritisation" entity indicates the need for a new transmission:
obtain the MAC PDU to transmit from the "Multiplexing and assembly" entity;
instruct the HARQ process corresponding to this TTI to trigger a new transmission using the identified parameters.
else:
flush the HARQ buffer.
else, if an uplink grant, indicating that the NDI is identical to the value in the previous transmission of this HARQ process (i.e. a retransmission takes place for this HARQ process), is indicated for this TTI:
instruct the HARQ process to generate an adaptive retransmission.
else, if the HARQ buffer of the HARQ process corresponding to this TTI is not empty:
instruct the HARQ process to generate a non-adaptive retransmission.
NOTE:A retransmission triggered by the HARQ entity should be cancelled by the corresponding HARQ process if it collides with a measurement gap or if a non-adaptive retransmission is not allowed.

In addition, as supported in 3GPP TS 36.213 v8.3.0 (2008 May), for a downlink subframe i, if a transport block was transmitted in the associated PUSCH subframe then:
if an Uplink Scheduling Assignment is received in subframe i with NDI toggled since the previous subframe corresponding to the same HARQ process, a new transmission shall be indicated to the higher layers;
else if an Uplink Scheduling Assignment is received in subframe i with NDI not toggled since the previous subframe corresponding to the same HARQ process, a re-transmission shall be indicated to the higher layers.
else if no Uplink Scheduling Assignment is received in subframe i, then:
if ACK is decoded on the PHICH, ACK shall be delivered to the higher layers;
else NACK shall be delivered to the higher layers.

In accordance with an exemplary embodiment of the invention, the UE 10 and the eNB 12 are each assumed to include a HARQ process or function 10E, 12E that operates in accordance with the exemplary embodiments of this invention, as discussed below and illustrated at least in FIG. 3.

In general, the exemplary embodiments of this invention may be implemented at least in part by computer software executable by the DP 10A of the UE 10 and by the DP 12A of the Node B 12, or by hardware, or by a combination of software and hardware. The processor implementing embodiments of the invention may be a main processor or another processor in a slave relation to the master main processor (e.g. baseband processor). The HARQ functional unit may be within the main processor or a slaved processor.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type of computer-readable medium suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

In accordance with certain exemplary embodiments of this invention the problems that were discussed above, and shown in FIG. 2, are overcome, and resource utilization is maximized, by performing UE 10 specific load balancing among HARQ processes, in particular for the case of semi-persistent scheduling in the LTE TDD UL. This load balancing procedure makes full use of available resources, thereby decreasing packet delay and enhancing system performance.

More specifically, when a new transmission packet and re-transmission packet from one UE 10 occur within one HARQ process, the re-transmission packet is transmitted during the time at which a collision would occur, and the new transmission packet is dynamically scheduled to a new resource in another, different HARQ process.

Figure 3:
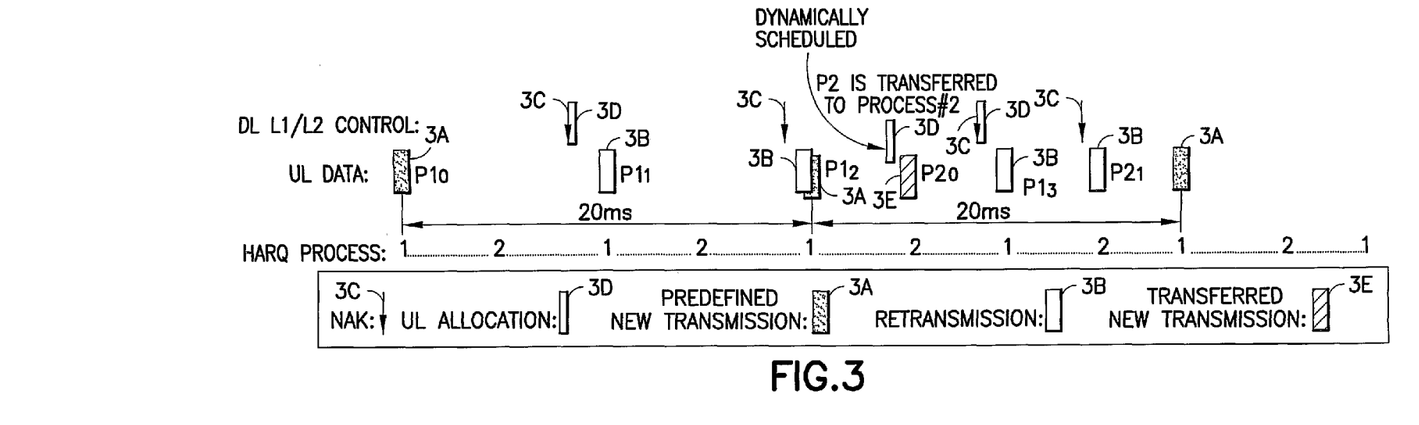
FIG. 3 shows a non-limiting example of user-specific load balancing among HARQ processes.

An example of an implementation of user-specific (UE-specific) load balancing among HARQ processes is shown in FIG. 3. This non-limiting example assumes the case of VoIP service and semi-persistent scheduling, as well as the "DUDDD" TDD case ($PX_Y$ means the Yth retransmission of Packet X).

Assume that the persistent allocation for the first transmission is in HARQ process #1 and occurs every 20 ms (the blocks labeled 3A). The blocks labeled 3B indicate re-transmissions made in response to receipt of a NACK (arrows labeled 3C). In this example it is assumed that there are three re-transmissions ($P1_1$, $P1_2$, $P1_3$) needed for new packet $P1_0$, and that one re-transmission ($P2_1$) is used for new packet $P2_0$.

At the end of the 20th ms, it can be observed that the second retransmission of P1 ($P1_2$) will collide with the predefined timeslot for P2.

In response to the detected collision, a NACK is sent to the UE 10 on the DL L1/L2 control, and the second re-transmission ($P1_2$) takes place using the predefined (persistently allocated) resources for the new transmissions (3A).

In accordance with an aspect of this invention, a delayed new transmission ($P2_0$) is dynamically scheduled in the UL allocation 3D by the eNB 12 to be transmitted later during the different HARQ process #2. It should be noted that the delayed new transmission ($P2_0$) can be freely allocated to occur in any HARQ process, since it is new transmission and not a re-transmission and thus is not constrained by the synchronous HARQ. Note as well that the re-transmission of $P2_0$ (i.e., $P2_1$) then also occurs in the second (different) HARQ process.

It can be further noted that only a new transmission that has collided with a re-transmission need be dynamically scheduled to another HARQ process, as other new transmissions can occur in the persistent fashion in process #1 if the loading in HARQ process #1 is reasonable.

By the use of this technique the UE 10 is enabled to distribute its UL packet load into all available HARQ processes, and can make full use of the HARQ processes and the physical resources. An additional advantage is that the use of this technique enables more re-transmissions to occur for, as an example, VoIP packets. Furthermore, no change is needed to be proposed or made to the synchronous HARQ in the LTE UL.

Simulation Analysis:

To avoid a collision between initial transmission and retransmission, one prior approach/method (new transmission over retransmission) is to delete the old packet (flush its HARQ process buffer) when it meets the next new packet and to let the new packet be ongoing in the HARQ process buffer. This approach may be suitable for a FDD case since there are five transmission chances before the re-transmission meets the next initial transmission (assuming the use of eight HARQ processes in FDD), particularly in view of the fact that very few packets ever require more than five transmissions. However, in the TDD case there is only one re-transmission available before a collision occurs (1 or 2 UL TTI in 5 ms and 2 or 3 ULTTI in 10 ms, i.e., the "DSDDUUD" case, "DSUDD" case, "DSUUDDDDDD" and "DSUUUDDDDD" shown in FIG. 1).

Figure 4:
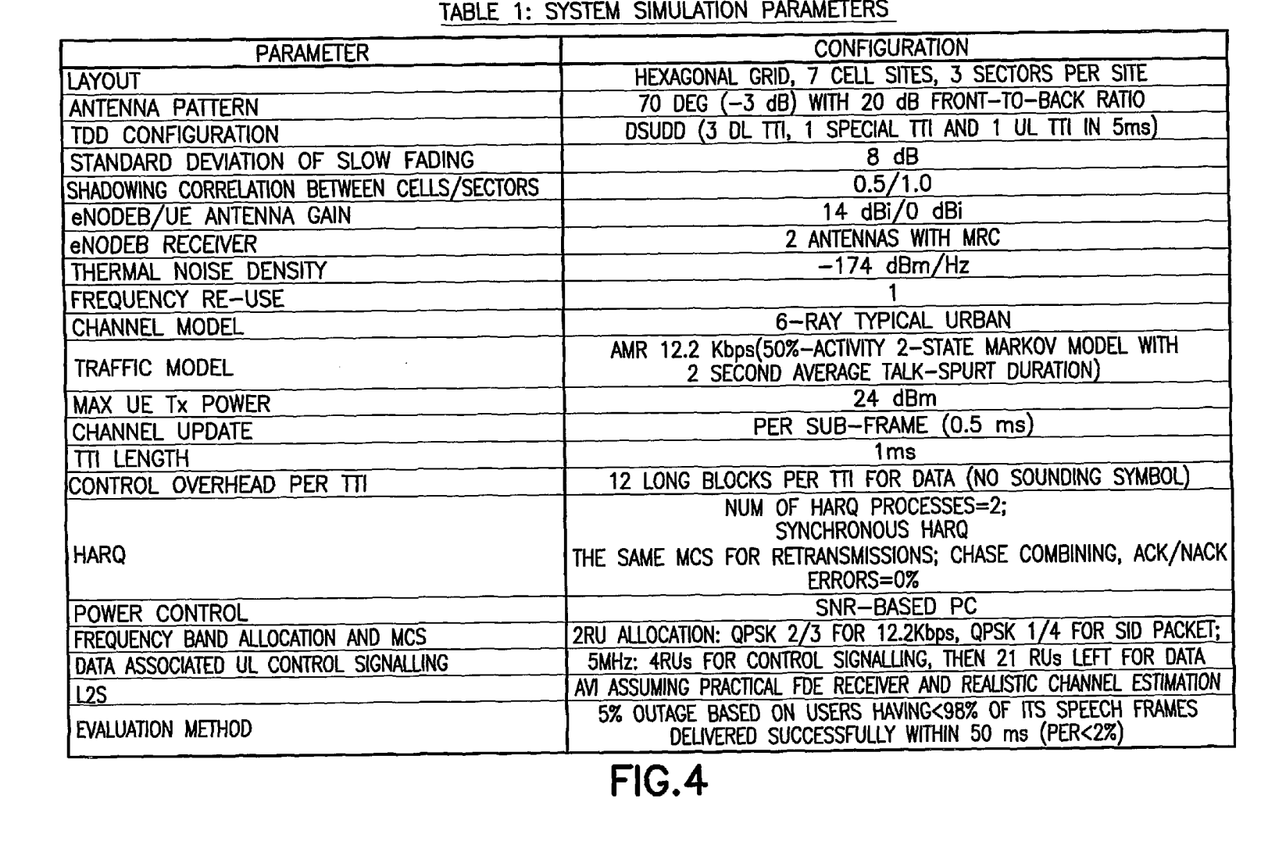
FIG. 4 shows a first table (Table 1) of system simulation parameters.
Figure 5:
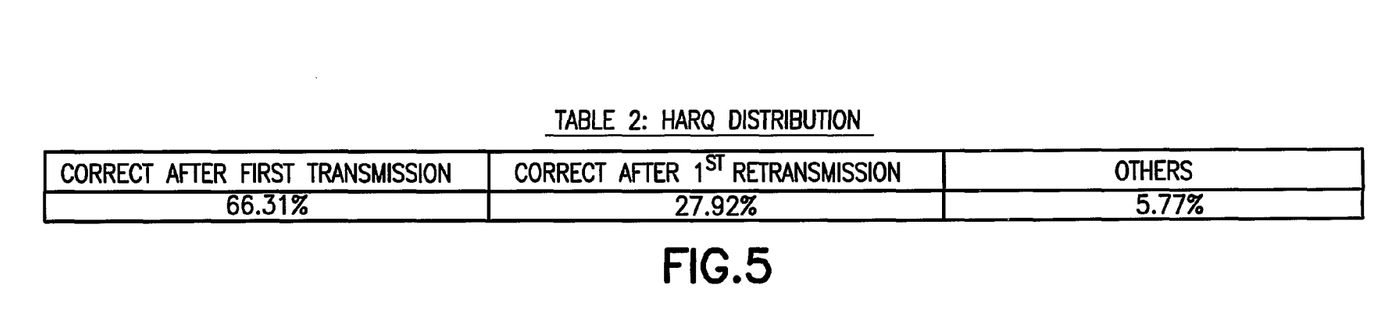
FIG. 5 shows a second table (Table 2) of HARQ distribution.

Based on a simulation using VoIP TDD UL, and using the exemplary parameters listed at Table 1/FIG. 4, when there are many VoIP UEs per sector, 5.77% of the packets need more than two transmissions (Table 2/FIG. 5). That is to say, 5.77% of the VoIP packets are not correctly received using the conventional approach. However, the goal should be a re-transmission percentage of about 2% or less to achieve a non-objectionable user experience. Thus, the use of the conventional method is expected to not be adequate. From the simulation results, by the use of the exemplary embodiments of this invention the capacity per sector is much higher than the capacity whereas the use of the conventional method.

Based on the foregoing it should be apparent that the exemplary embodiments of this invention provide a method, apparatus and computer program product(s) to enable UL load balancing between available HARQ processes, with the technical effect of enhancing wireless link resource usage.

Figure 7:
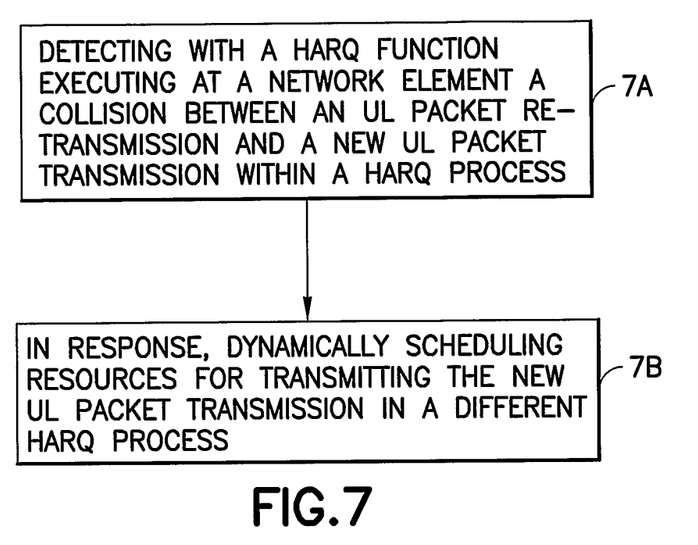
FIGS. 7 and 8 are each a logic flow diagram illustrative of a method, and the execution of computer program instructions, in accordance with the exemplary embodiments of this invention.

Referring to FIG. 7 there is shown a method where a HARQ function executing at a network element or a component for such a network element detects a collision between an UL packet re-transmission and a new UL packet transmission within a HARQ process (Block 7A); and in response the HARQ function dynamically schedules resources for transmitting the new UL packet transmission in a different HARQ process (Block 7B). In accordance with the exemplary embodiments of the invention the dynamically scheduled resource can be allocated by transmitting the allocation to a network device such as a UE.

In the method of the previous paragraph, resources may be persistently allocated for transmitting the new packet transmission in the different HARQ process.

The method of the preceding paragraphs may be executed in an eNB.

The method of the preceding paragraphs may be performed as a result of the execution of program instructions stored in a memory medium of an eNB.

It can be further appreciated that an aspect of this invention pertains to a HARQ functional unit embodied in an eNB that is configurable to detect a collision between an UL packet re-transmission and a new UL packet transmission within a HARQ process and, in response, the HARQ functional unit is further configurable to dynamically schedule resources to a UE for transmitting the new UL packet transmission in a different HARQ process.

In a particular aspect for the HARQ functional unit of the previous paragraph, resources are persistently allocated for transmitting the new packet transmission in the different HARQ process.

It can be further appreciated that an aspect of this invention pertains to an apparatus that comprises means for detecting a collision between an UL packet re-transmission and a new UL packet transmission within a HARQ process; and that further comprises means for dynamically allocating resources for transmitting the new UL packet transmission in a different HARQ process.

Figure 8:
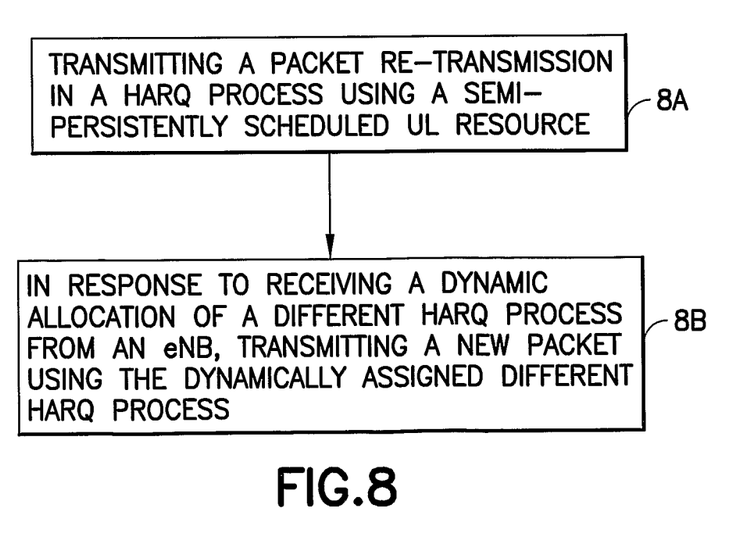

Referring to FIG. 8, also disclosed herein is a method executable by a UE or by a component for a UE, for transmitting a packet re-transmission in a HARQ process using a semi-persistently scheduled UL resource (Block 8A); and responsive to receiving a dynamic allocation of a different HARQ process from an eNB, transmitting a new packet using the dynamically assigned different HARQ process (Block 8B).

In an embodiment for the method and the UE of the previous paragraph, resources are persistently scheduled for the UE for transmitting the new packet transmission in the different HARQ process.

Also disclosed is a UE that comprises a HARQ functional unit operable to transmit a packet re-transmission in a HARQ process using a semi-persistently scheduled UL resource; and that is responsive to receiving a dynamic allocation of a different HARQ process from an eNB, to transmit a new packet using the dynamically assigned different HARQ process.

In an embodiment of the UE of the previous paragraph, resources are persistently scheduled for the UE for transmitting the new packet transmission in the different HARQ process.

Also disclosed is an apparatus comprising means for transmitting a packet re-transmission in a HARQ process using a semi-persistently scheduled UL resource; and means, responsive to receiving a dynamic allocation of a different HARQ process, for transmitting a new packet using the dynamically assigned different HARQ process.

The various blocks shown in FIGS. 7 and 8 may be viewed as method steps, and/or as operations that result from operation of computer program code, and/or as a plurality of coupled logic circuit elements of an integrated circuit constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as signaling diagrams, block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof As such, it should be appreciated that at least some aspects of the exemplary embodiments of the inventions may be practiced in various components such as integrated circuit chips and modules. The design of integrated circuits is by and large a highly automated process and the resultant design may be transmitted in a standardized electronic format (e.g., Opus, GDSII, or the like) to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems. Process steps may be taken concurrently or out of the order explicitly described in the text description where one step does not require completion of another.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    detecting with a hybrid automatic repeat request function a collision between an uplink packet re-transmission and a new uplink packet transmission within a hybrid automatic repeat request process; and
    in response, the hybrid automatic repeat request function dynamically allocating resources for transmitting the new uplink packet transmission in a different hybrid automatic repeat request process that does not collide with the uplink packet re-transmission.

2. The method according to claim 1, wherein the resources are persistently allocated for transmitting the new uplink packet transmission in the different hybrid automatic repeat request process.

3. The method according to claim 1, wherein the allocated resources are sent on a physical downlink control channel to a user equipment.

4. The method according to claim 1, wherein the method is executed by a network element.

5. A computer readable medium encoded with a computer program executable by a processor to perform actions comprising:
    detecting with a hybrid automatic repeat request function a collision between an uplink packet re-transmission and a new uplink packet transmission within a hybrid automatic repeat request process; and
    in response, the hybrid automatic repeat request function dynamically allocating resources for transmitting the new uplink packet transmission in a different hybrid automatic repeat request process that does not collide with the uplink packet re-transmission.

6. The computer readable medium encoded with a computer program according to claim 5, where resources are persistently allocated for transmitting the new uplink packet transmission in the different hybrid automatic repeat request process.

7. An apparatus comprising:
    a hybrid automatic repeat request functional unit configured to detect with a hybrid automatic repeat request function, a collision between an uplink packet re-transmission and a new uplink packet transmission within a hybrid automatic repeat request process; and
    in response, the hybrid automatic repeat request functional unit being configured to dynamically allocate resources for transmitting the new uplink packet transmission in a different hybrid automatic repeat request process that does not collide with the uplink packet re-transmission.

8. The apparatus according to claim 7, wherein the apparatus is embodied in a network element.

9. The apparatus according to claim 7, wherein resources are persistently allocated for transmitting the new uplink packet transmission in the different hybrid automatic repeat request process.

10. The apparatus according to claim 7, wherein the allocated resources are sent on a physical downlink control channel to a user equipment.

11. A method comprising:
    transmitting a packet re-transmission in a hybrid automatic repeat request process using a semi-persistently scheduled uplink resource; and
    responsive to receiving a dynamic allocation of a different hybrid automatic repeat request process, transmitting a new packet using the dynamically allocated different hybrid automatic repeat request process.

12. The method according to claim 11, further comprising persistently allocating a resource for transmitting the new packet transmission in the different hybrid automatic repeat request process.

13. The method according to claim 11, wherein the dynamic allocation of the different hybrid automatic repeat request process is received from a network element.

14. A computer readable medium encoded with a computer program executable by a processor to perform actions comprising:
    transmitting a packet re-transmission in a hybrid automatic repeat request process using a semi-persistently scheduled uplink resource; and responsive to receiving a dynamic allocation of a different hybrid automatic repeat request process, transmitting a new packet using the dynamically allocated different hybrid automatic repeat request process.

15. The computer readable medium encoded with a computer program of claim 14, where a resource is persistently allocated for transmitting the new packet transmission in the different hybrid automatic repeat request process.

16. The computer readable medium encoded with a computer program of claim 14, where the dynamic allocation of the different hybrid automatic repeat request process is received from a network element.

17. An apparatus comprising:
a hybrid automatic repeat request functional unit configured to transmit a packet re-transmission in a hybrid automatic repeat request process using a semi-persistently scheduled uplink resource; and
responsive to receiving a dynamic allocation of a different hybrid automatic repeat request process, the hybrid automatic repeat request functional unit configured to transmit a new packet using the dynamically allocated different hybrid automatic repeat request process.

18. The apparatus of claim 17, wherein the dynamic allocation comprises a resource is persistently allocated for transmitting the new packet transmission in the different hybrid automatic repeat request process.

19. The apparatus of claim 17, further comprising a receiver configured to receive the dynamic allocation of the different hybrid automatic repeat request process from a network element.

20. The apparatus of claim 17, wherein the apparatus is embodied in a user equipment.

* * * * *